United States Patent Office 3,630,860
Patented Dec. 28, 1971

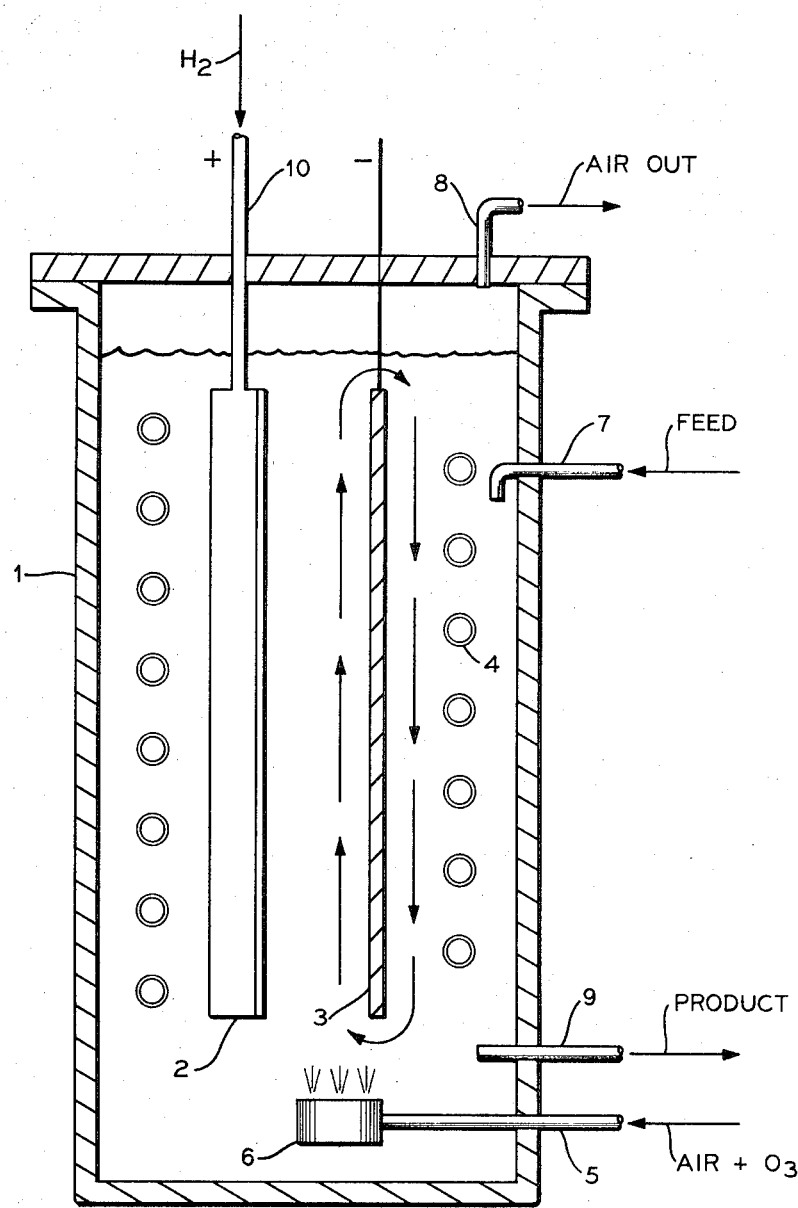

3,630,860
ELECTROCHEMICAL TREATMENT OF MATERIAL PRODUCED BY REACTION IN ELECTROCHEMICAL CELL
Homer M. Fox, Bartlesville, Okla., assignor to Phillips Petroleum Company
Filed Feb. 5, 1970, Ser. No. 8,978
Int. Cl. C07b 29/06; C07c 47/00, 49/00
U.S. Cl. 204—73 R                              10 Claims

ABSTRACT OF THE DISCLOSURE

A chemical reaction is conducted in an electrochemical cell to provide a material to be acted on at a cell electrode. Thus, a single step ozonolysis of a cyclic olefin within in situ electrochemical reduction to provide a dialdehyde and/or a ketone is disclosed. An electrochemical cell, the hydrogen-depolarized anode of which can be replaced by a conventional platinum, carbon, nickel, etc. anode, suitably with a diaphragm separating it from the cathode is used, having in the cell an electrolytic solvent, e.g., an alcohol such as methanol and a supporting electrolyte such as an acid, e.g., acetic acid or a salt thereof. The olefin which can be one leading to the formation of an alpha, omega-dialdehyde, e.g., cyclododecene, is fed to the cell to which air and azone are also fed into a lower part of the cell below the cathode, the air and ozone being sparged in one embodiment into the cell liquid below the electrode creating a stirring or mixing action at the cathode to which the olefin is also fed. Cooling is provided to maintain the temperature of the cell. The low concentration of ozonide in the operation is a feature of the invention to prevent degradation and other problems encountered with ozonides.

This invention broadly relates to the production, in situ in an electrochemical cell, of a material to be acted on by one of the cell electrodes.

In one of its aspects the invention relates to the production of an aldehyde and/or ketone. In another of its aspects the invention relates to the production of a dialdehyde, for example, a dialdehyde useful upon reductive ammonolysis to produce a diamine which in turn is useful in the production of a synthetic fiber.

In one of its concepts the invention provides a process for effecting a chemical reaction in an electrochemical cell to provide therein a material to be acted on at an electrode of said cell. The electrode of such cell can act on said material as it is produced.

In another of its concepts the invention provides an electrochemical reduction which is performed simultaneously in a cell in which ozonolysis of an olefin is taking place, thus to produce aldehyde and/or ketone products. In still another of its concepts the invention provides for such a process, a solvent such as an alcohol, say, methanol, ethanol, isopropanol or the like. In a further concept there is provided a supporting electrolyte such as an acid, e.g., acetic acid or a salt thereof, for example, sodium acetate or mixtures of these. A small stream is taken from the cell and processed to recover product therefrom and the residual process stream, which may contain unconverted olefin, is returned to the cell.

In still another of its concepts the invention provides an electrochemical cell structure for continuously ozonating a material and simultaneously electrochemically reducing a product of ozonolysis which comprises means for introducing ozone to, say, below an electrode of such a cell and means within said cell coacting with said means for introducing ozone to cause the introduced ozone to intermix with and to provide stirring of the azonolysis product at said electrode.

In a further concept, the invention provides for the treatment, as herein described, of an acylic polyene.

An object of this invention is to provide a combination chemical reaction and electrochemical reaction operation. Another object of this invention is to produce, in situ in an electrochemical cell, a combination of reactions, one of which involves reaction with a material produced in said cell in another of said reactions. A further object of this invention is to prepare a product such as an aldehyde and/or a ketone. A still further object of this invention is to convert an olefin. A further object still is to convert a cyclic olefin to a dialdehyde. A further object, still, is to convert an acyclic proylene. Another object is to provide a new electrochemical cell structure suited to continuous operation wherein a plurality of chemical reactions, one of which may be electrochemical in character, are effected.

Other aspects, concepts and object of the invention are apparent from a study of this disclosure, the drawing and the appended claims.

According to the present invention there is produced in situ in an electrochemical cell a material which it is then immediately acted upon in said cell by one of the electrodes in said cell.

Also, according to the invention the aldehyde and/or ketone are produced by the conversion of an olefin to an ozonide which then is electrochemically reduced to form an aldehyde and/or ketone product.

Still according to the invention there is provided an apparatus or cell structure which comprises means for introducing ozone to a cell, preferably to the catholyte thereof, and means within said cell coacting with said means for introducing ozone to cause the introduced ozone to intermix with and to provide stirring of the liquid at the electrode in said catholyte. The cell also is provided with means for continuously introducing a material, for example, an olefin, to be converted and for continuously withdrawing at least a portion of the electrolyte or fluid in the cell to process the same to recover product therefrom. Means can be provided for returning the thus processed electrolyte or fluid to the cell for further use.

The invention can be applied to any olefin, cyclic or acyclic, or to mixtures of olefins, which lend themselves to handling in the cell described using solvents and supporting electrolyte, also as described. Presently, one of the classes of olefins of a primary interest are those which will produce an apha, omega-dialdehyde, e.g., one which on reductive ammonolysis will yield a diamine which can be used as a fiber monomer in the production of a synthetic fiber.

More specifically, the applicable olefins are cyclic or acyclic, mono- or polyenes having from 2 to about 30 carbon atoms per molecule. Such olefinic materials will contain from 1 to about 6 double bonds and can also contain aryl or cycloalkyl substituents on the molecule. Preferred olefins are unbranched cyclic monoolefins having from 5 to about 12 carbon atoms per molecule. Some specific examples of applicable olefins are

| | |
|---|---|
| ethylene, | cyclopentene, |
| butene-2, | 3-ethylcyclohexene, |
| hexene-3, | cyclohexene, |
| 2-methyloctene-2, | cyclooctene, |
| 5-cyclohexyldecene-3, | 1,5-cyclooctadiene, |
| tetradecene-4, | cyclodecene, |
| 10-benzyleicosene-7, | cyclododecene, |
| triacontene-12, | cyclopentadecene, | and the like and mixtures thereof.

To illustrate the process of the reaction and the products obtainable therefrom, the following simplified equations are presented using, as an example, a preferred cyclic olefinic feed such as cyclodocene. The reactions shown below take place concurrently in the apparatus and under the conditions of the present invention.

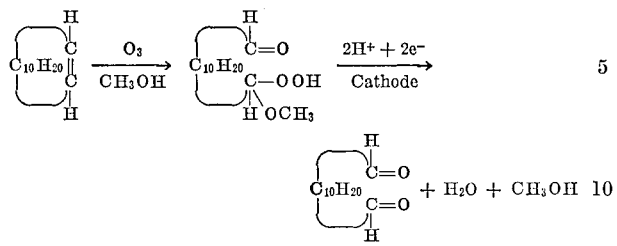

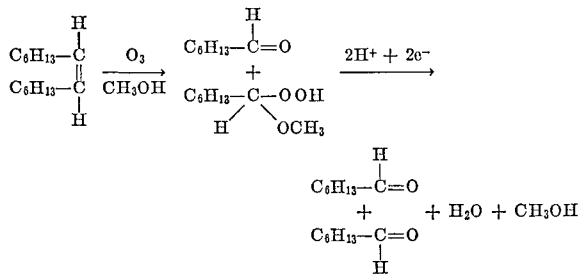

Similar reactions can occur with other cyclic monoolefins. Acyclic monoolefins will produce monofunctional products according to the following, using tetradecene-4 as an example:

Cyclic and acyclic polyenes, because ozonation and cleavage can occur at each double bond, will provide mixtures of the corresponding monofunctional and difunctional products.

When there is branching at the double bond of the olefin, a final product can be a ketone. For example, if 2,3-diphenylbutene-2 is present, it can be converted to methylphenylketone.

In the drawing there is shown a diagram of a cell which can be used in the process of the invention.

Referring now to the drawing it will be described in connection with the example given herein of the ozonization or ozonolysis of a cycloolefin, that is, cyclododecene, in the cathode chamber of an electrochemical cell in which the ozonolysis product is reduced to the corresponding alpha,omega-dialdehyde at the cathode. The cell electrolyte in this instance being methanol-lithium perchlorate, thus combining the ozonolysis step with the electrochemical reduction.

In electrochemical cell or tank 1 there is disposed, as one skilled in the art will understand, a porous hydrogen-depolarized anode and a cathode, 2 and 3, respectively. The cell 1 contains electrolyte up to a level to substantially completely cover the electrodes. The anode is depolarized by a flow of hydrogen through 10. A cooling coil 4 is disposed in a manner in the cell to cool the same. The principal reaction being described takes place at the cathode. Air and ozone are passed into a lower portion of the cell through pipe 5 and out into the cell liquid through sparger 6. The sparger is located below cathode 3 in a manner to encourage circulation of the catholyte in the manner shown by the arrows. Olefin feed is introduced by pipe 7 and is intimately distributed into the liquid, passing downwardly between the cell wall and cathode 3, the flowing liquid, as indicated by the arrows, impinging against the cooling coil and thus being further stirred or intermixed. The cell is divided into a catholyte compartment and an anolyte compartment by an ion-permeable divider (not shown) as may be desired.

Air is removed overhead from cell 1 by pipe 8. Preferably, means, not shown, are provided to return entrained liquids to the cell. Cell liquid containing product dialdehyde is removed through pipe 9. The proportion of the removed liquid to that remaining in the cell is such that cell operation is not impeded. A relatively small amount of the cell liquid is removed through 9 for recovery of dialdehyde product therefrom. This liquid can then be returned to the cell by means not shown for sake of simplicity.

The ozone-containing stream is conventionally produced by an arc process ozone generator. Air or oxygen is partially converted to ozone and the mixed stream is passed into the catholyte zone of the cell at a rate sufficient to provide about one molecule of ozone per double bond of the feed olefin. The olefin, in turn, is fed into the reaction zone at a rate sufficient to maintain a hydrocarbon concentration of up to about 10 weight percent based on the total cell mixture.

The ozone sparger and other piping can be made of any suitable material and in the instance described is made of plastic such as a polyolefin, Teflon, etc.

The hydrogen-depolarized anode can be platinum catalyzed or nickel catalyzed if the pH of the liquid in the cell is sufficiently high. It can be replaced by a conventional anode made of platinum, carbon, nickel, etc., in which instance an ion-permeable divider between the anode and the cathode will preferably be used. When a divider is used, it will be a typical electrolytic diaphragm such as an acid ion exchange membrane. Of course, the diaphragm can be used even though hydrogen anode is used. The anode can be of any conventional and convenient structure and design.

The cathode is preferably of silver. Its shape and size will depend upon the design of the cell but it can be in the form of a sheet, screen, bar, cylinder, or other shape and structure. Preferably, its form and location in the cell will be such that it provides a baffle around which the catholyte can be circulated under the influence of the ozone-containing stream. Contact of the ozone with the cathode itself and mixing of the catholyte with the anolyte is minimized.

Although the temperature of operation can be varied widely, depending upon the reactions being performed, the kind of electrolyte in the cell and other conditions, as one skilled in the art in possession of this disclosure having studied the same will understand in the operation described, the preferred operating temperature will be in the range of approximately $-30$ to $80°$ C., more preferably at about $60°$ C. in which event cooling tower water can be used in the coil. Any convenient pressure sufficient to maintain a liquid phase within the cell is suitable.

The cell can be of any appropriate materials of construction which are compatible with the chemical materials involved. Sufficient cell voltage is applied to provide a cathode potential, using a saturated calomel electrode as reference, in the range of from about $-0.2$ to about $-0.8$ volt, preferably from about $-0.3$ to about $-0.6$ volt. Any convenient current density, such as in the range of from about 1 to about 500 ma./cm.$^2$ can be used. The cell case can be cathodic, if desired, and in some instances, the case can act as the cathode.

The advantages of the described cell and its operation for in situ producing a material to be electrochemically acted upon are various and include, among others, that the concentration of the ozonide or other material produced in situ is maintained low, indeed, about as low as desired, to considerably cut down to the bare minimum the time during which it must exist before it has been converted in the cell by electrochemical action. Degradation to other undesirable products is thus prevented. At all times very small quantities of ozonide, when this is the material, prepared in situ, will be present and, therefore, any decomposition taking place will be minimal.

The mixing or circulation created by the upward ozone-containing air flow about the electrode provides an immediate intimate admixing of ozonide as formed with the liquid surrounding the electrode.

The cell, as described, possesses the further advantage of permitting continuous, as distinguished from continual, operation. It permits immediate conversion of the intermediate material, e.g., the ozonide, thus enhancing purity of product.

For the reaction described a porous platinum anode is now preferred. The anode can be depolarized by feeding hydrogen gas down into the combination hydrogen feed tube and current collector at 10.

Although the alcohols having up to about 3 carbon atoms have been set forth as preferred, and this because of the good conductivity of their solutions, there can also be employed other solvent combinations suitable to the conditions desired to be maintained in the cell. Solvents comprising mixtures of alcohols and ethers, acetones, are useful but less satisfactory than, say, methanol. A six percent tetrahydrofuran-methanol solution can be used as solvent. It is now preferred to have some alcohol present for the ozonolysis product preparation.

As electrolytes, tetrabutyl ammonium perchlorate, paratoluene sulfonic acid, ammonium acetate, acetic acid, sodium acetate and others can be used additional to those earlier mentioned. In general, any electrolyte which has sufficient solubility in the cell solvent, which provides substantial conductivity, and which is not substantially decomposed at either the anode or the cathode can be used.

The acid electrolytes are now considered to be preferable because these avoid erratic current behavior which alkalinity causes.

To avoid aldol condensation, the solution in the cell can be buffered and the acetic acid-sodium acetate buffer is now preferred. A methanol reaction medium containing about 10 weight percent acetic acid and about 4 weight percent sodium acetate has been found to be particularly effective.

When suitable selective cell dividers, such as certain ion exchange resin membranes, are employed, it is possible to utilize the above-described solvent-electrolyte combinations in the cathode compartment and another simpler electrolyte system, such as an aqueous sulfuric acid solution, in the anode compartment. In this event, a simple lead anode can be utilized. It would liberate oxygen which can be utilized to enrich the air going to the ozone generator.

EXAMPLE

In a cell, as generally pictured in FIG. 1, is positioned a cylindrical hollow anode of porous carbon catalyzed by prior impregnation of 0.5 weight percent platinum metal. A silver cathode having a geometric surface area of about 90 cm.$^2$ and in the form of a ⅛-inch mesh wire gauze is vertically positioned opposite the anode and across about ⅔ the width of the cell. A Teflon sparger is positioned beneath the cathode. An olefin feed inlet is positioned in the upper portion of the catholyte chamber beneath the electrolyte level. A vent is located in the vapor space of the cell.

The anolyte and catholyte both consist of methanol in which are dissolved 10 weight percent acetic acid and 4 weight percent sodium acetate. The anolyte and catholyte are maintained at the desired temperature by circulating chilled water in cooling coils located in each compartment.

The cell operates under the following conditions:

Cyclododecene feed rate: 2.0 moles/hr.
Ozone feed rate:[1] 2.1 moles/hr.
Hydrogen feed rate: 2.1 moles/hr.
Cell temperature: 60° C.
Current: 134 amps.
Cathode potential: −0.44 volt (vs. SCE)
Faradays: 2.5 Faradays/mole cyclododecene
Current density, cathode: 150 ma./cm.$^2$
Average residence time in cell: 1 hr.

[1] As a 5 percent ozone in air mixture produced by arc process ozone generator.

The ozonated air passes into the cell solution and the air exits the cell through the vent and through a demister to return entrained liquids. The cell contents are continuously fed from the reaction zone through the liquid outlet near the bottom of the catholyte zone and at a rate to maintain the one hour average residence time. The cell contents are continuously subjected to a stripping and vacuum distillation step to separate the mixture into its components. Alpha, omega-dodecanedialdehyde is recovered in 87 percent yield based on cyclododecene. Water and heavy by-products are rejected. Methanol, acetic acid, sodium acetate, and unconverted olefin and alkoxyperoxide are recycled to the cell.

One skilled in the art in possession of this disclosure will consider the usual precautions to be taken to avoid formation and/or accumulation of oxidation products, e.g., hydrocarbon oxidation products, which under some conditions, especially at lower temperatures, may be the cause of undesirable decomposition in the cell as in apparatus associated therewith.

Reasonable variation and modification are possible within the scope of the foregoing disclosure, drawing and the appended claims to the invention the essence of which is that a process for acting on a material at an electrode of an electrochemical cell which comprises forming said material at said electrode in said cell and acting at said electrode on said material as it is formed has been set forth and described; in one embodiment the process involving the production of a dialdehyde and/or a ketone by ozonating an olefin in the cell and simultaneously therein reducing electrochemically the product of said ozonization; and that a cell structure for operation of the process of the invention has been set forth substantially as described.

I claim:

1. A process for producing at least one of a dialdehyde and a ketone which comprises ozonizing an olefin in an electrochemical cell in presence of an alcohol and simultaneously in said cell reducing, electrochemically, an intermediate product resulting from said ozonization.

2. A process according to claim 1 wherein a portion of the cell liquid is removed from the cell, processed to recover product and then returned to said cell.

3. A process according to claim 1 wherein the olefin is cyclododecene.

4. A process according to claim 1 wherein the cell electrolyte is at least one of a lower alcohol such as methanol.

5. A process according to claim 1 wherein the cell contains a supporting electrolyte.

6. A process according to claim 5 wherein the supporting electrolyte is at least one of an acid such as acetic acid or salt thereof or a mixture of acid and a salt thereof.

7. A process according to claim 1 wherein the olefin is cyclododecene and the electrolyte is an alcohol-lithium perchlorate.

8. A process according to claim 1 wherein a cyclic olefin is ozonized to break the ring to form a linear compound having an aldehyde at one end and a peroxide group at the other end and wherein the peroxide group is converted to an aldehyde group by electrochemical reduction in said cell.

9. A process according to claim 1 wherein the olefin is at least one of a cyclic olefin and an acyclic olefin.

10. A process according to claim 1 wherein the olefin is an acyclic polyene.

References Cited

UNITED STATES PATENTS

| | | | |
|---|---|---|---|
| 1,365,956 | 1/1921 | Senderens | 260—599 X |
| 2,898,350 | 8/1959 | Sturvock | 260—599 X |
| 3,362,971 | 1/1968 | Mitchell | 260—597 R |
| 3,379,768 | 4/1968 | Corson et al. | 260—599 R |

FOREIGN PATENTS

| | | | |
|---|---|---|---|
| 321,567 | 5/1920 | Germany | 204—75 |

FREDERICK EDMUNDSON, Primary Examiner

U.S. Cl. X.R.

204—277; 260—339, 597 R, 599